Aug. 8, 1950 A. J. SCHLEPER 2,517,721
POWER TAKE-OFF
Filed March 19, 1948
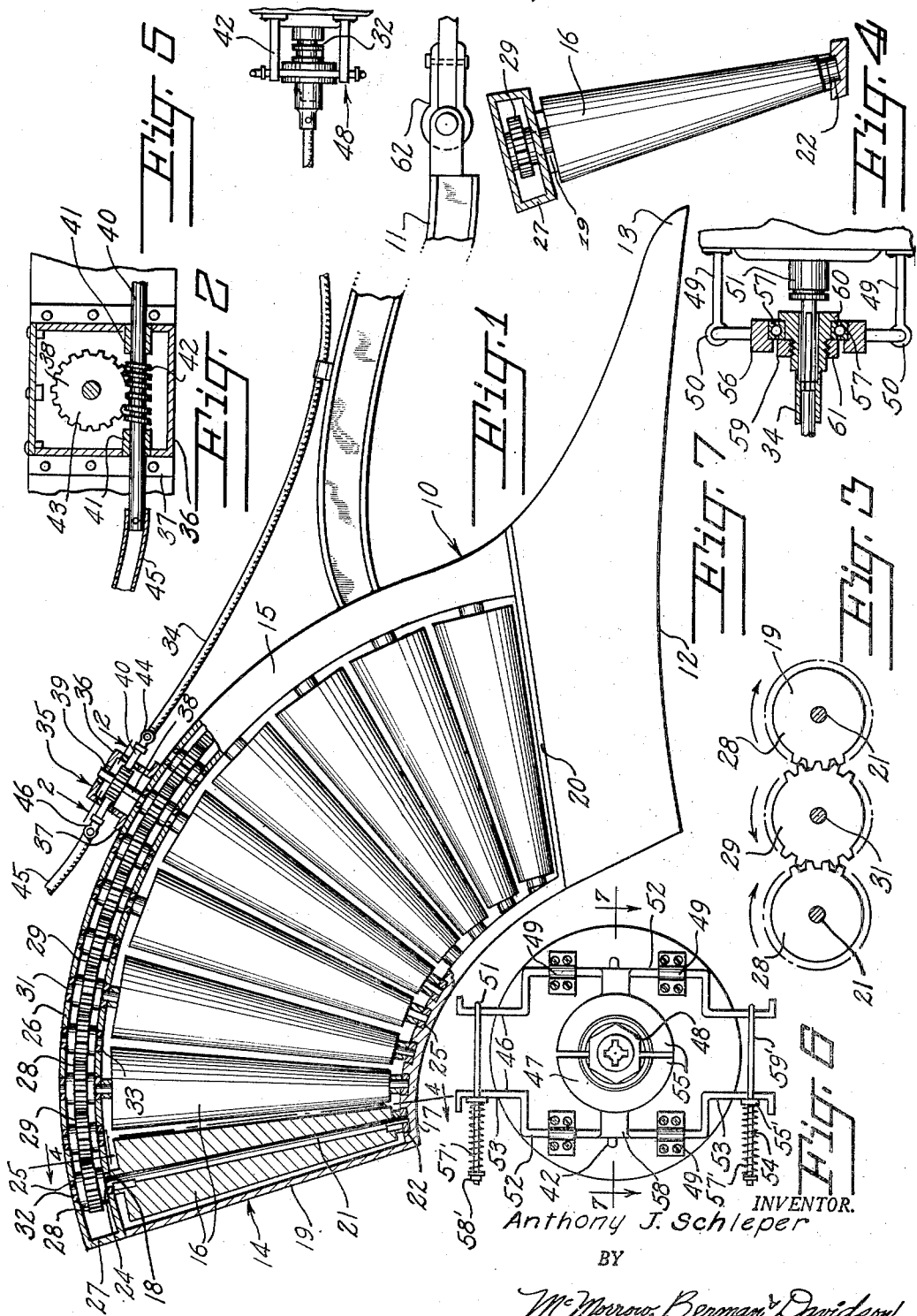
INVENTOR.
Anthony J. Schleper
BY
McMorrow, Berman & Davidson
Attorneys Patented Aug. 8, 1950

2,517,721

UNITED STATES PATENT OFFICE 2,517,721

POWER TAKE-OFF

Anthony J. Schleper, Highland, Ill.

Application March 19, 1948, Serial No. 15,883

3 Claims. (Cl. 74—15.6)

This invention relates to an improved plow having rollers carried by the mold board thereof.

It is an object of this invention to provide an improved plow of the kind to be more particularly described hereinafter, having rollers carried by a frame substituted for the usual mold board operatively connected to the power take-off of the towing tractor for facilitating the plowing operation of the plow.

Another object of this invention is to provide an improved plow of this kind having a drive shaft between the transmission for the rollers and the power take-off fitting of the tractor, and further to provide an automatic release coupling between an end of the drive shaft and the power take-off fitting.

Other objects and advantages will become apparent from a consideration of the following description in conjunction with the accompanying drawings, wherein:

Figure 1 is a side elevation partly broken away and partly in section of an improved plow illustrative of the invention;

Figure 2 is a transverse cross-section of a power transmission unit taken on the line 2—2 of Figure 1, and shown on a somewhat enlarged scale;

Figure 3 is a diagrammatic view of the connection between the gears of adjacent rollers;

Figure 4 is a vertical cross-section taken substantially on the line 4—4 of Figure 1;

Figure 5 is a side elevation of an automatically releasable coupler for securing the plow drive shaft to the power take-off of a tractor;

Figure 6 is a rear elevation on an enlarged scale of the coupler shown in Figure 5;

Figure 7 is a transverse cross-section on the line 7—7 of Figure 6.

With continued reference to the drawings, the plow, generally indicated at 10, has a conventional hook-shaped beam 11 provided at its lower end with a conventional shoe, not illustrated, a plow share 12 secured to one side of the beam shoe and a conventional land slide connected to the opposite side, the land slide and share converging forwardly to the usual plow point 13. In place of the conventional mold board there is substituted a structure, generally indicated at 14, comprising a frame 15 shaped somewhat like a mold board, and tapered rollers 16 journaled in the frame.

Frame 15 may conveniently comprise a lower arcuate portion 17, an upper arcuate portion 18 longer than the portion 17 and substantially uniformly spaced therefrom, a rear end portion 19 joining the rear ends of the portions 17 and 18, and a front end portion 20 joining the front ends of portions 17 and 18.

When the plow is in normal operative position, the upper frame member 18 diverges rearwardly from a vertical plane which includes the longitudinal center line of the plow so that earth raised by the plow share 12 will be gradually turned over by the rollers 16 journaled in frame 14 and deposited in a contiguous furrow. This means that the rear roller 16 is inclined upwardly and outwardly to the vertical plane which includes the longitudinal centerline of the plow. The rollers in front of the rear roller may be inclined at successively smaller angles, the outer surface of the foremost roller adjacent frame portion 20 being substantially parallel to the above-described vertical plane.

Each roller 16 is of circular cross-section and tapered from top to bottom and preferably comprises a cylindrical, axial shaft 21 and an outer casing secured to the shaft against rotation relative thereto.

The lower end of each shaft 21 is journaled in a suitable anti-friction bearing 22 mounted in a respective bearing aperture 23 in lower frame portion 17. The upper end portion of each shaft 21 is journaled in a pair of spaced-apart, anti-friction bearings 24 and 25, the inner one 24 of which is mounted in a respective bearing aperture in outer frame portion 18, and the outer one 25 of which is mounted in a respective bearing aperture or boss in the outer wall 26 of a hollow, elongated housing 27 which extends along the outer surface of outer frame portion 18. Bearings 22, 24 and 25 may be conventional tapered roller bearings, or bearings of other conventional construction, as may be desired. Housing 27 has spaced-apart side walls which, together with outer frame portion 18 and outer housing wall 26, inclose a space of rectangular cross-section, and end walls closing the ends thereof so that the interior of the housing is sealed against the entrance of dirt and water.

A respective tapered or beveled gear 28 is secured on each shaft 21 between frame outer portion 18 and outer housing wall 26 and tapered idler gears 29 are disposed one between each two adjacent roller gears 28 and in mesh therewith, as diagrammatically illustrated in Figure 3. An axle 31 extends through each idler gear 28 and is journaled at its upper end in an anti-friction bearing 32 mounted in a corresponding opening in housing outer wall 26 and at its lower end in an anti-friction bearing mounted in a corresponding aperture in frame outer portion 18.

With this construction, when one of the gears 28 or 29 is rotated, all of the rollers 16 will be rotated in the same direction about the axes of respective shafts 21.

When the plow is in operation, the rollers will be rotated in a direction such that their outer earth-contacting surfaces move rearwardly relative to the plow in which they are mounted, and at a speed such that average velocity of the outer surfaces of the rollers is substantially equal to the forward velocity of the plow when in operation and there is a minimum of relative movement between the outer surfaces of the rollers and the earth which is turned by the plow.

In order to maintain the rotational speed of the rollers at the proper value and facilitate the turning of the earth by the plow, the rollers are driven from the power takeoff of the towing tractor by suitable means including an extensible drive shaft 34 and a transmission unit, generally indicated at 35.

The transmission unit comprises a hollow, rectangular housing 36 having an open end surrounded by an external flange 37 secured to outer housing wall 26 and bearing against the outer surface thereof. An extension 38 is provided on one of the shafts 21 or axles 31 and is journaled at its outer end in an anti-friction bearing 39 mounted in an aperture in the outer end wall of housing 36. A transverse shaft 40 is journaled in bosses 41 provided on the end walls of housing 36 and is disposed at right angles to and spaced from shaft 38. Shaft 40 has a worm 42 thereon and a worm gear 43 secured on shaft 38 is in mesh with worm 42.

The rear end of drive shaft 34 is connected to the front end of transverse shaft 40 by a universal joint 44 and a flexible or extensible shaft 45 is connected to the rear end of shaft 40, preferably by a second universal joint 46.

The front end of shaft 34 is secured to the towing tractor by a suitable, automatically releasable coupler, generally indicated at 48, and illustrated in Figures 5, 6 and 7. This coupler comprises two pairs of stems 49, each stem being secured at one end to the towing tractor and provided at its opposite end with an apertured eye 50. These stems are mounted so that the two pairs are disposed at diametrically-opposite sides of the power take-off fitting 51 of the tractor and closely adjacent the fitting. A double crank shaft 52 is rotatably mounted in the aligned apertured eyes of each pair of stems, these crank shafts being substantially parallel and each having a crank 53 on each end thereof. The two cranks 53 at corresponding ends of the crank shafts are normally positioned toward each other and are resiliently held in a common plane by respective resilient units each comprising a hairpin-shaped strut 54' placed around the corresponding cranks, an apertured washer 55' slidably receiving the legs of said strut and bearing against one of said cranks, and a pair of compression springs 57' respectively surrounding the legs of the strut between washer 55' and the outer ends of the legs where they bear against abutment washers 58'. A respective yoke 55 is carried by each crank shaft 52 between the eyes of the corresponding stems 49. Each yoke comprises a half-ring 56 of rectangular cross-section having a semi-annular groove 57 in the inner surface thereof and an arm 58 extending from the center portion of the half-ring to the corresponding crank shaft 52.

An anti-friction ball or roller bearing 59 has its inner race mounted on a cylindrical step on shaft 34 and clamped between a fixed shoulder 60 and a nut 61. The outer race of this bearing is received in the semi-annular groove 57 in the yokes 56 and the splined end of shaft 34 is thereby held in driving association with the splined power take-off fitting 51 as long as the yokes 56 are held substantially in a common plane by the spring means connected to the cranks 53.

As shown in Figure 6, the releasable coupling 48 is disposed adjacent the coupling 62 between the front end of the plow beam 11 and the tractor. The coupling 62 is usually provided with a shear pin or other releasing means to free the tractor in case the plow strikes an obstruction such as a stump or large stone. If the coupling 62 releases, the coupling 48 will also automatically release to free the shaft 34 without damage to the shaft or the tractor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A releasable coupling for holding a drive shaft in operative association with a tractor power take-off fitting, comprising two pairs of stems adapted to be secured to the tractor and extend outwardly around the tractor power take-off fitting, a pair of parallel crank shafts journaled in the outer ends of said stems, a yoke carried by each crank shaft, said yokes extending inwardly of said crank shafts and together constituting a split ring surrounding said drive shaft, an anti-friction bearing operatively disposed between said split ring and said drive shaft means, and resilient means operatively connected between the cranks of said crank shafts to resiliently hold said yokes substantially in a common plane and the drive shaft in operative association with the tractor power take-off fitting.

2. A releasable coupling for holding a drive shaft in operative assembly with a tractor power takeoff fitting comprising a pair of crank shafts disposed in spaced apart, substantially parallel relationship at respectively opposite sides of the power takeoff fitting, means securing said crank shafts to the tractor for rotational movements about their respective longitudinal center lines, a yoke carried by each crank shaft, said yokes extending inwardly of said crank shafts and together constituting a split ring surrounding the drive shaft and having an annular bearing seat therein, an anti-friction bearing secured on the drive shaft and received in said bearing seat, and spring means connected between said crank shafts to resiliently hold said yokes in ring forming position to releasably hold the drive shaft in operative assembly with the power takeoff fitting, said yokes being pivotally movable to release said anti-friction bearing when subjected to an excessive separating force between the drive shaft and the tractor.

3. A releasable coupling for holding a drive shaft in operative assembly with a tractor power takeoff fitting comprising, a pair of shafts disposed at respectively opposite sides of the power takeoff fitting and in spaced apart, substantially parallel relationship to each other, means engaging said shafts for rotatably supporting the latter from a tractor, a yoke extending from each shaft toward the power takeoff fitting, said yokes together constituting a split ring, an anti-friction bearing carried by said yokes for receiving a drive shaft and supporting the latter in operative assembly with the power takeoff fitting, said yokes being movable to release said bearing in response to a separating force between the drive shaft and the power takeoff fitting, and resilient means connected between said shafts and resisting movement of said yokes to release said anti-friction bearing.

ANTHONY J. SCHLEPER.

REFERENCES CITED

The following references are of record in the file of this patent:

UNITED STATES PATENTS

| Number | Name | Date |
| --- | --- | --- |
| 1,867,517 | Lofstrand | July 22, 1932 |
| 1,884,009 | Lofstrand | Oct. 25, 1932 |
| 2,111,713 | Watson | Mar. 22, 1938 |
| 2,425,992 | Cadwallader | Aug. 19, 1947 |